April 16, 1935.  L. T. WATRY  1,997,879
AIR VOLUME CONTROL
Filed Nov. 12, 1931
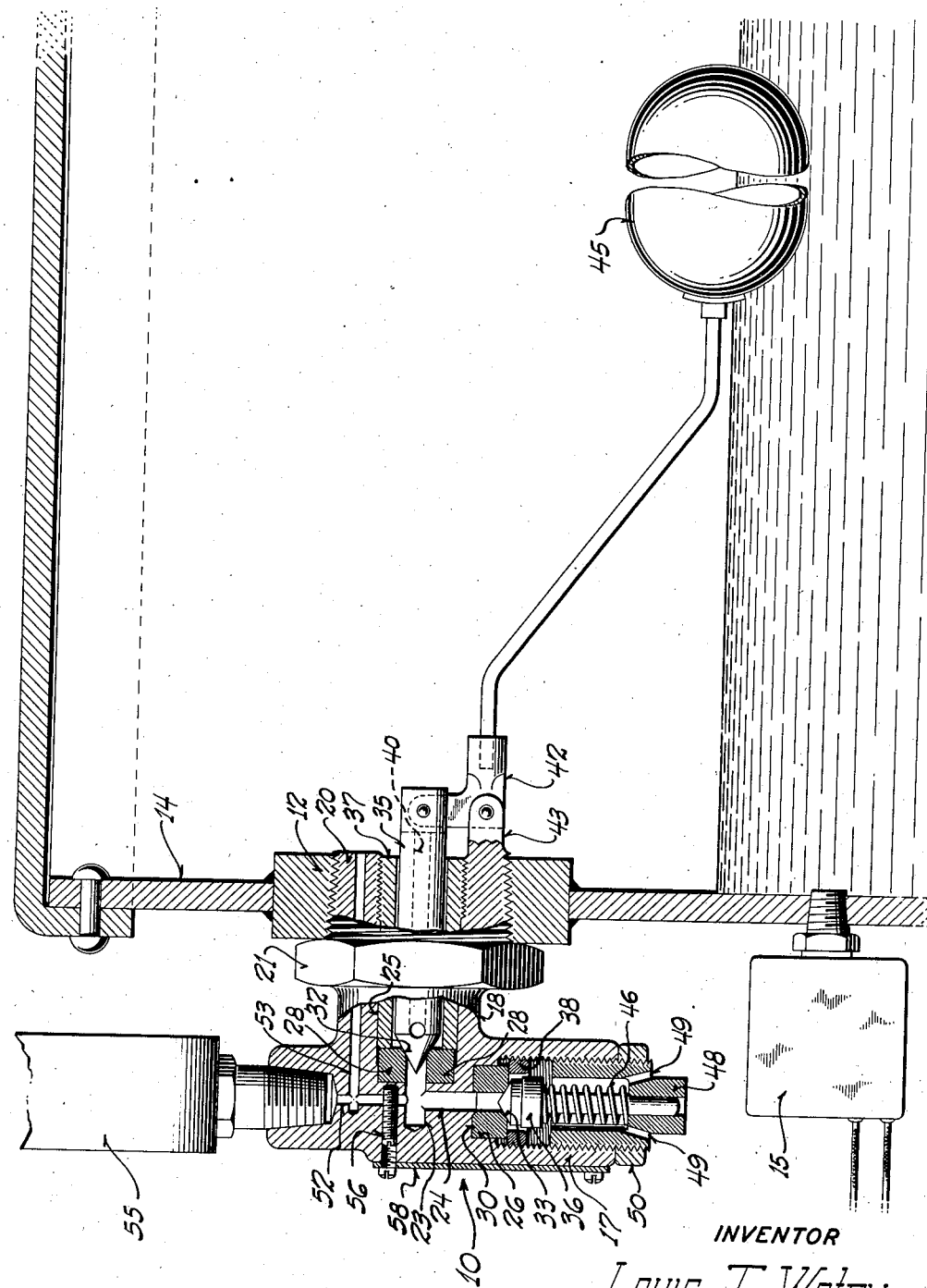
INVENTOR
*Louis T. Watry*
BY *Ira Milton Jones*
ATTORNEY

UNITED STATES PATENT OFFICE 1,997,879

AIR VOLUME CONTROL

Louis T. Watry, West Allis, Wis.

Application November 12, 1931, Serial No. 574,558

1 Claim. (Cl. 137—68)

This invention relates to air volume controls and more particularly to a device which is adapted to prevent an excess amount of air in a liquid pressure tank or the like.

In deep well pumping systems employing a hydro-pneumatic pressure tank it is common practice to have a diaphragm switch or other mechanism actuated by the pressure of fluid within the tank to start the pump when the pressure within the tank reaches a set minimum and stop the pump when the pressure has built up to a given maximum. With such systems, an air pump is employed to inject a small quantity of air into the pressure tank upon each stroke of the pump. In systems heretofore employed either a manually operated vent valve or a float control valve has been used to prevent air binding in the tank. Both of these devices fail to control both the volume and the pressure of the air within the tank and have proved very unsatisfactory.

It is, therefore, an object of the present invention to provide a valve which will control both the volume of air and the pressure of the air within a hydro-pneumatic tank whereby sufficient air dome will be available to supply the necessary pressure in the liquid system, and sufficient liquid will be maintained to supply peak loads.

It is a further object of the invention to maintain the air dome in the tank under a minimum pressure whereby a constant delivery of fluid to the line is assured.

These and other objects, the nature of which will become apparent from the following specification are accomplished by means of a preferred form of the invention shown in the accompanying drawing in which:

The drawing shows a cross sectional view of a portion of a pressure tank with the relief valve forming the subject matter of the present invention incorporated therein.

Referring to the accompanying drawing, a relief valve, which is generally designated 10, may be mounted in a threaded opening or spud 12 in the tank 14. A pressure actuated switch 15 is mounted on the tank 14 and communicates with the interior of the tank, and is adapted to start the pump (not shown) upon the pressure within the tank dropping to a set minimum and to stop the pump when a desired maximum pressure is attained. The relief valve comprises a main body 17 extending vertically and having a horizontal branch 18 terminating in an internally and externally threaded member 20. A nut 21 is formed integrally with the threaded end member 20 and facilitates screwing the relief valve 10 into the spud 12.

The valve 10 is provided with a pair of intersecting bores 23 and 24 in the horizontal branch and in the main body portion respectively. The bores 23 and 24 open into counterbores 25 and 26 respectively, the shoulders between the bores and the counterbores forming an abutment for valve seats 28 and 30, the valve seats being provided with ports therethrough aligning with the ports 23 and 24.

The valves 28 and 30 are provided with suitable seats 32 and 33 adapted to accommodate the valve members 35 and 36 respectively. The valve seats are held firmly in place against their respective shoulders by a pair of externally threaded sleeves 37 and 38 which screw into threaded ends of the bores 25 and 26, respectively, and clamp the valve seats onto the shoulders.

The valve 35 is slidably mounted in the sleeve 37, there being sufficient space between the valve 35 and the sleeve 37 to permit the free passage of air therebetween. If desired, an axial bore 40 may be provided through the valve 35 and intersect a radial bore adjacent the conical valve member to insure the passage of air therethrough. The valve 35 is actuated by a bell crank lever 42 pivotally connected at the central portion to a bracket 43 extending from the horizontal extension 18.

The position of the valve is controlled through the bell crank lever by a float 45 which upon rising, seats the valve firmly on its seat to prevent the escape of air therepast.

The valve 36 is held constantly on the seat 33 by a spring 46 which is retained in a cup-like valve cage 48 and presses upwardly on the valve. Ports 49 are provided through the member 48 to permit the escape of air past the valve 36 to the atmosphere. The valve cage 48 is threaded in the body member 17 to provide means to adjust the spring 46 for any desired pressure within the tank. If desired, a scale may be provided in the tank, indicating the pressure at which the air will vent for any vertical position of the cage 48. The cage 48 is held in adjusted position by a lock nut 50 which prevents the relative movement of the cage 48 in the body member 17.

A second pair of passages 52 and 53 in the main portion 17 and the branch 18 respectively communicate with a pressure gage 55 so that the pressure within the tank is always available, to facilitate proper regulation.

The port 52 is preferably continued past the port 53 so that it intersects the vertical bore 24 to provide a passage for air from the interior of the tank 14 through the passages 53, 52 and 24 to the relief valve 36. A screw 56 having a fillister head is screwed into a corresponding bore in the casing which intersects the bore 52 between the bore 53 and the bore 23. The screw 56 serves as a valve which constantly closes the passage between the interior of the tank and the bore 24 through the bore 53.

It will be noted that the head of the screw 56 lies beneath a name plate 58 so that the name plate must be removed before the screw can be loosened.

If desired, a ball or other check valve may be arranged in the passage 52 with any common means to dislodge the valve to permit pressure to be communicated from the passage 52 to the passage 24.

The extension of the bore 52 into the bore 24 provides a supplemental means for adjusting the spring tension so that the valve 36 vents at the required pressure.

When it is desired to set the valve for any given pressure, water is pumped into the tank until that pressure registers upon the gage 55. The set screw 56 may then be opened to communicate this pressure through the bore 53 to the bore 24 and the valve 36 suitably adjusted so that air barely leaks through the valve 36. The set screw 50 may then be tightened to make this adjustment permanent and the screw 56 reset so that it completely closes the port 52 from the port 24 and the plate 58 replaced on the valve body 10. The device is now set and ready for its normal operation which is as follows:

*Operation*

In operation, it is usually desired to keep a given pressure of air within the tank 14. That is, it is desirable to maintain the air with the minimum pressure, for example, of twenty pounds and a maximum pressure of not over forty pounds. It has also been found a desirable feature to have the lower third of the tank for reserve water to be drawn only in times of peak or emergency, while the middle third of the tank is figured to carry the ordinary load encumbrant upon the system, and the top third of the tank is usually figured as being the air dome. It will be seen that with this arrangement, that if the pressure is forty pounds per square inch when the tank is two-thirds full, it will be twenty pounds when the tank is only one-third full. The spring 46 of the relief valve shown in the accompanying drawing is set for the minimum pressure it is desired to maintain at any definite level.

That is, if the float were set to open the valve 35 at a point where the tank was only one-third filled, the spring would be set, in the example given, at twenty pounds. When the water level drops to a point where the tank is only one-third filled, if the pressure within the tank at this point is greater than the setting of the spring pressed valve 36, the air will vent past the opened valve 35 and dislodge the valve 36 from its seat and escape therepast to the atmosphere. This process will continue until the air has dropped to the desired pressure, at the correct volume.

At this point, that is when the air has dropped to the desired minimum the pressure actuated switch 15 becomes effective to start the pump which pumps both water and air into the tank. However, the volume of air pumped into the tank is not appreciable in relation to the volume of water and the small amount of added air does not noticeably decrease the volume of water within the tank. Upon the water level rising, the float 45 rises, closing the valve 35 and preventing further escape of air past the valve 36. When the pressure within the tank reaches a desired maximum which is, in the example given, forty pounds, the pressure actuated switch 15 snaps open, stopping the action of the pump and preventing further entrance of both air and water into the tank.

If any appreciable amount of air enters the tank between the time the float controlled valve 35 closes and the time the switch 15 operates to stop the action of the pump, the excess air will vent upon the water volume again reaching the desired minimum. This excess air can also be taken care of by setting the relief valve 36 to open the valve at a slightly lower pressure to account for the excess air that will be pumped in during the filling of the tank.

It will be understood that the example given in the operation of the device is merely typical of the use of this device in conjunction with a hydropneumatic tank and that the setting of the valves 35 and 36 can be arranged for any set of conditions desired.

It is obvious that this device is susceptible to wider application than water tanks and could, for example, very readily be used with oil tanks or similar analogous uses, and it is not, therefore, desired to limit the invention to the precise form herein shown and described, but only by the scope of the appended claim.

What is claimed as new and desired to secure by Letters Patent is:

In a valve device adapted to regulate the volume of air within a hydropneumatic tank, a valve body securable in an opening in one wall of the tank and having a passage to communicate the tank interior with the atmosphere, a float controlled valve in the passage, a float movably mounted from the valve body and adapted to actuate said valve, a pressure relief valve closing said passage externally of said float controlled valve, said relief valve being adjusted to open upon the attainment of a predetermined pressure within the tank and with the float controlled valve open, a pressure gauge mounted on said valve body and communicated directly with the interior of the tank through a secondary passage formed in the valve body, and means to facilitate adjustment of the pressure relief valve comprising a port communicating the first mentioned passage with the secondary passage at a point externally of the float controlled valve whereby said pressure relief valve is subjected directly to the pressure within the tank which is also registered on the pressure gauge, and means to close said port.

LOUIS T. WATRY.